(12) United States Patent
Laaksonen

(10) Patent No.: US 12,081,965 B2
(45) Date of Patent: Sep. 3, 2024

(54) SPATIAL AUDIO MODIFICATION

(71) Applicant: Nokia Technologies Oy, Espoo (FI)

(72) Inventor: Lasse Laaksonen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 249 days.

(21) Appl. No.: 17/683,482

(22) Filed: Mar. 1, 2022

(65) Prior Publication Data
US 2022/0286802 A1    Sep. 8, 2022

(30) Foreign Application Priority Data

Mar. 4, 2021   (EP) .................................... 21160679

(51) Int. Cl.
*H04S 7/00*    (2006.01)
*H04R 5/04*    (2006.01)

(52) U.S. Cl.
CPC ............... *H04S 7/303* (2013.01); *H04R 5/04* (2013.01); *H04S 2400/11* (2013.01); *H04S 2420/01* (2013.01)

(58) Field of Classification Search
CPC . G06F 3/01; G06F 3/011; G06F 3/017; G06F 3/0346; H04R 5/04; H04S 7/00; H04S 7/302; H04S 7/303; H04S 2400/11; H04S 2420/01
USPC .......................................................... 381/17
See application file for complete search history.

(56) References Cited

U.S. PATENT DOCUMENTS

| | | | |
|---|---|---|---|
| 8,509,454 B2 | 8/2013 | Kirkeby et al. | |
| 9,973,874 B2 | 5/2018 | Stein et al. | |
| 10,542,368 B2 | 1/2020 | Vilermo et al. | |
| 2013/0114819 A1* | 5/2013 | Melchior | H04S 7/30 381/59 |
| 2015/0223002 A1 | 8/2015 | Mehta et al. | |
| 2016/0183024 A1* | 6/2016 | Karkkainen | H04S 7/303 381/17 |
| 2018/0109901 A1 | 4/2018 | Laaksonen | |

(Continued)

FOREIGN PATENT DOCUMENTS

| | | |
|---|---|---|
| EP | 2936485 A1 | 10/2015 |
| EP | 3499917 A1 | 6/2019 |

(Continued)

OTHER PUBLICATIONS

Rummukainen et al., "Perceptual Study of Near-Field Binaural Audio Rendering in Six-Degrees-of-Freedom Virtual Reality", IEEE Conference on Virtual Reality and 3D User Interfaces (VR), Mar. 23-27, 2019, pp. 448-454.

(Continued)

*Primary Examiner* — Harry S Hong
(74) *Attorney, Agent, or Firm* — SQUIRE PATTON BOGGS (US) LLP

(57) ABSTRACT

According to various, but not necessarily all, embodiments there is provided an apparatus comprising means for: obtaining an input audio signal comprising at least first audio content and second audio content; rendering an output audio signal with the first and second audio content spatialised in an audio scene; and increasing a distance, within the audio scene, between the first and second audio content in response to an increase in distance, in the real world, between a user and a default listening position relative to a device.

20 Claims, 6 Drawing Sheets

REAL WORLD

AUDIO SCENE

(56) References Cited

U.S. PATENT DOCUMENTS

Figure 1:
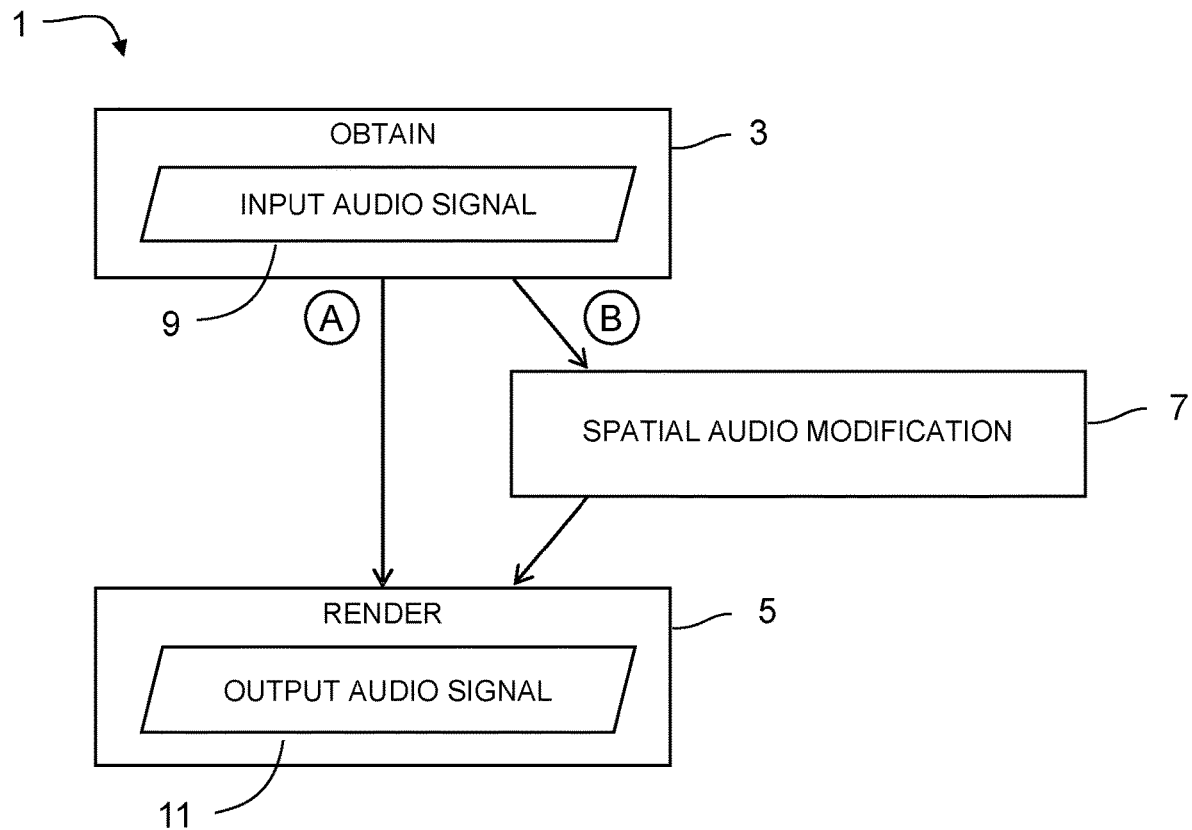

| | | |
|---|---|---|
| 2018/0324539 A1 | 11/2018 | Lovitt |
| 2019/0166446 A1 | 5/2019 | Eronen et al. |
| 2019/0385369 A1 | 12/2019 | Laaksonen et al. |
| 2020/0162833 A1 | 5/2020 | Lee et al. |
| 2020/0344563 A1 | 10/2020 | Mate et al. |
| 2020/0344564 A1* | 10/2020 | Laaksonen ....... H04N 21/44218 |
| 2021/0168555 A1* | 6/2021 | Laaksonen .............. H04S 7/304 |

FOREIGN PATENT DOCUMENTS

| | | |
|---|---|---|
| EP | 3503102 A1 | 6/2019 |
| WO | 2014/099285 A1 | 6/2014 |

OTHER PUBLICATIONS

European Application No. 21152210.7, "Indication of Responsibility for Audio Playback", filed on Jan. 19, 2021, pp. 1-33.

Extended European Search Report received for corresponding European Patent Application No. 21160679.3, dated Jul. 22, 2021, 11 pages.

Communication pursuant to Article 94(3) EPC dated Jun. 12, 2024 corresponding to European Patent Application No. 21160679.3.

* cited by examiner

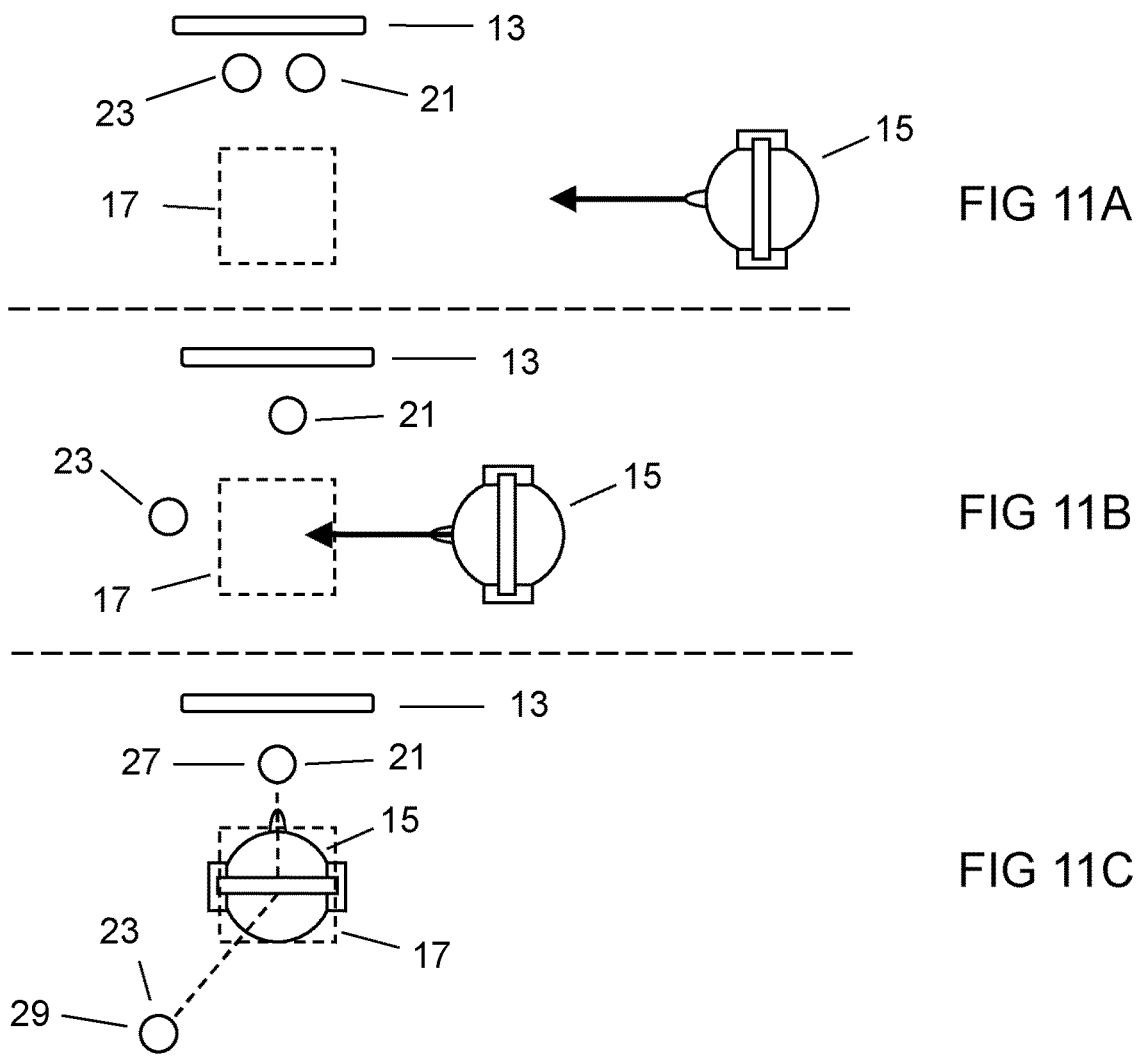
FIG 11A
FIG 11B
FIG 11C
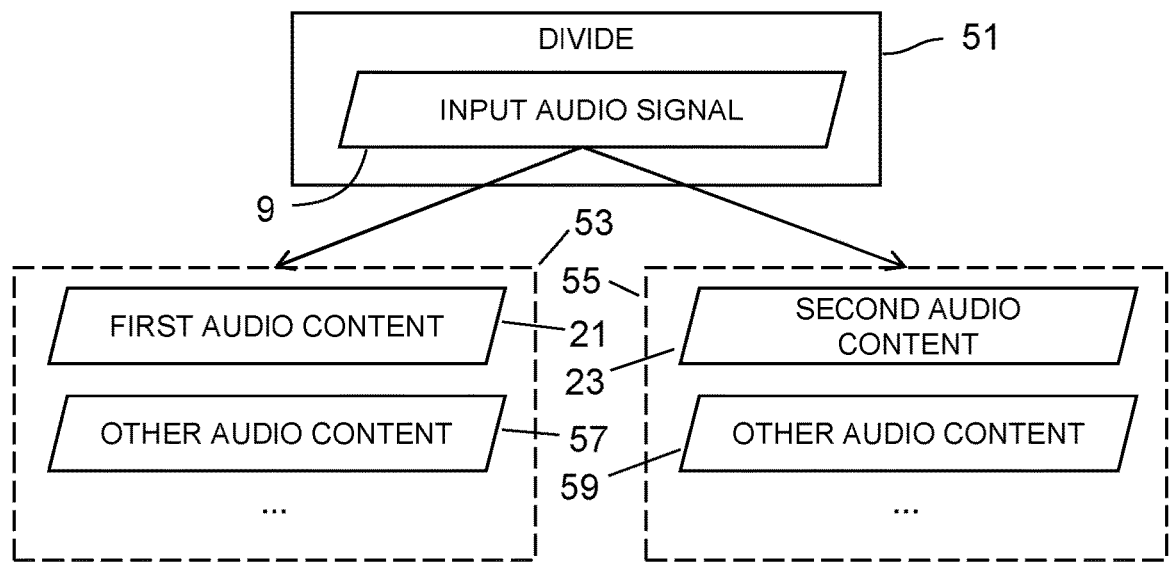
FIG 12

SPATIAL AUDIO MODIFICATION

RELATED APPLICATION

This application claims priority to the European patent application number 21160679.3, filed on Mar. 4, 2021, the content of which is incorporated herein by reference in its entirety.

TECHNOLOGICAL FIELD

Embodiments of the present disclosure relate to spatial audio modification. Some relate to spatial audio modification responding to distance between a user and a device.

BACKGROUND

Playback of spatial audio content via headphones results in audio content following the movements of the listener and accordingly providing no clues as to the location of the device 13 providing the spatial audio content to the headphones if the spatial audio content is rendered in stereo or with a view point having the three degrees of freedom of orientation within the audio scene.

If the spatial audio content is rendered with a view point having six degrees of freedom (the three of orientation and the three of location), the audio content does not follow the movements of the listener and as the listener moves away from the audio content it can become difficult to clearly hear.

Playback of spatial audio content via a loudspeaker system is limited by the directions and locations provided by the loudspeaker array. As the listener moves away from those directions the audio content can become difficult to clearly hear.

BRIEF SUMMARY

According to various, but not necessarily all, embodiments there is provided an apparatus comprising means for: obtaining an input audio signal comprising at least first audio content and second audio content; rendering an output audio signal with the first and second audio content spatialised in an audio scene; and increasing a distance, within the audio scene, between the first and second audio content in response to an increase in distance, in the real world, between a user and a default listening position relative to a device.

According to various, but not necessarily all, embodiments there is provided a method comprising: obtaining an input audio signal comprising at least first audio content and second audio content; rendering an output audio signal with the first and second audio content spatialised in an audio scene; and increasing a distance, within the audio scene, between the first and second audio content in response to an increase in distance, in the real world, between a user and a default listening position relative to a device.

According to various, but not necessarily all, embodiments there is provided a computer program that, when run on a computer, performs: causing an input audio signal comprising at least first audio content and second audio content to be obtained; causing an output audio signal to be rendered with the first and second audio content spatialised in an audio scene; and causing an increase in a distance, within the audio scene, between the first and second audio content in response to an increase in distance, in the real world, between a user and a default listening position relative to a device.

The following portion of this 'Brief Summary' section, describes various features that may be features of any of the embodiments described in the foregoing portion of the 'Brief Summary' section. The description of a function should additionally be considered to also disclose any means suitable for performing that function.

As the distance, in the real world, between the user and the default listening position increases, the first audio content may maintain its default position within the audio scene. Its default position corresponds to spatial information comprised in the input audio signal.

The second audio content may be at greater distance from the user within the audio scene than if, in the real world, the user was at the default listening position.

The position of the second audio content within the audio scene may be dependent on the direction in which the user is displaced from the default listening position.

Increasing the distance, within the audio scene, between the first and second audio content may comprise displacement of the second audio content from its default position within the audio scene. Its default position corresponds to spatial information comprised in the input audio signal.

The displacement of the second audio content from its default position within the audio scene may comprise a translation equal to: a scalar multiple of a displacement of the second audio content from the user at its default position; and/or the displacement of the default listening position from the user. The scalar multiple depends on a magnitude of a displacement of the default listening position from the user The scalar multiple may further depend on the direction of the displacement of the default listening position from the user.

The translation may be selected based on the direction of the displacement of the default listening position from the user.

In response to a trigger event, at least one of the first and second audio content may be moved closer to at least one of the device and the default listening position.

The at least one of the first and second audio content may be moved to one of: a position corresponding to the device; a position corresponding to the default listening position; or respective positions corresponding to their default positions translated by the displacement of the default listening position from the user, their default positions corresponding to spatial information comprised in the input audio signal.

If the distance between the user and the default audio position does not decrease in response to the movement of one of the first and second audio content, the other of the first and second audio content may be moved closer to at least one of the device and the default listening position.

As a distance between the user and the default audio position decreases, the at least one of the first and second audio content moved to decrease its distance from at least one of the device and the default listening position may be moved again towards respective positions corresponding to their default positions translated by the displacement of the default listening position from the user. Their default positions correspond to spatial information comprised in the input audio signal.

Audio content comprised in the input audio signal may be divided into at least: a first group, which comprises the first audio content; and a second group which comprises the second audio content.

A spatial audio modification applied to the first audio content, if any, may also be applied to other audio content of the first group. A spatial audio modification applied to the second audio content, if any, may also be applied to other audio content of the second group.

Audio content may be selectively assigned to the first or second groups based on the audio content descriptors and/or spatial information regarding the audio content.

According to various, but not necessarily all, embodiments there is provided examples as claimed in the appended claims. The scope of protection sought for various embodiments of the invention is set out by the independent claims. The examples and features, if any, described in this specification that do not fall under the scope of the independent claims are to be interpreted as examples useful for understanding various embodiments of the invention.

BRIEF DESCRIPTION

Figure 2:
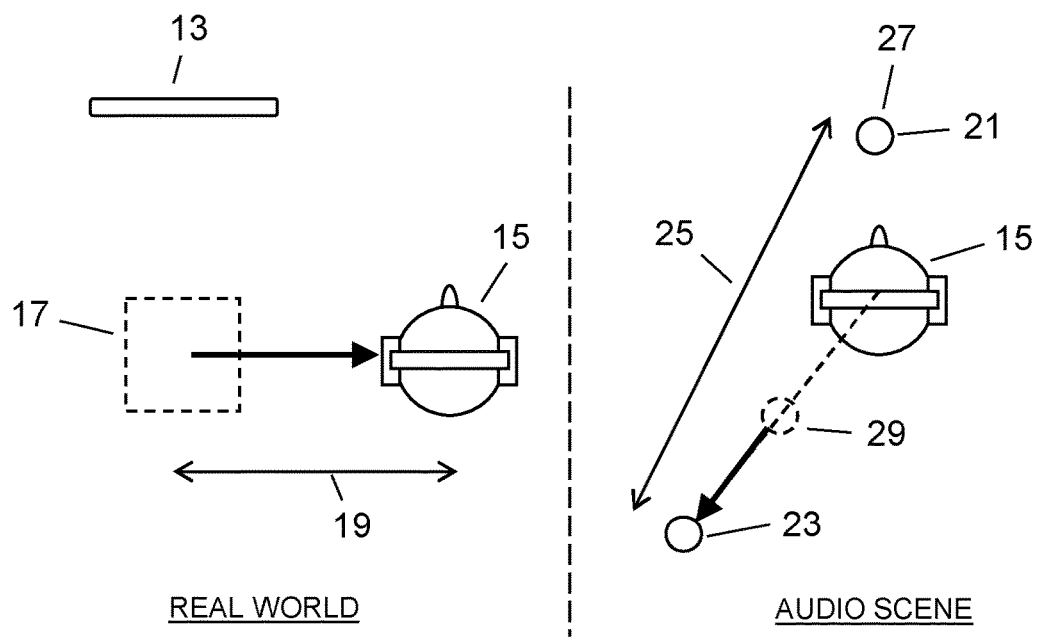
Figure 3:
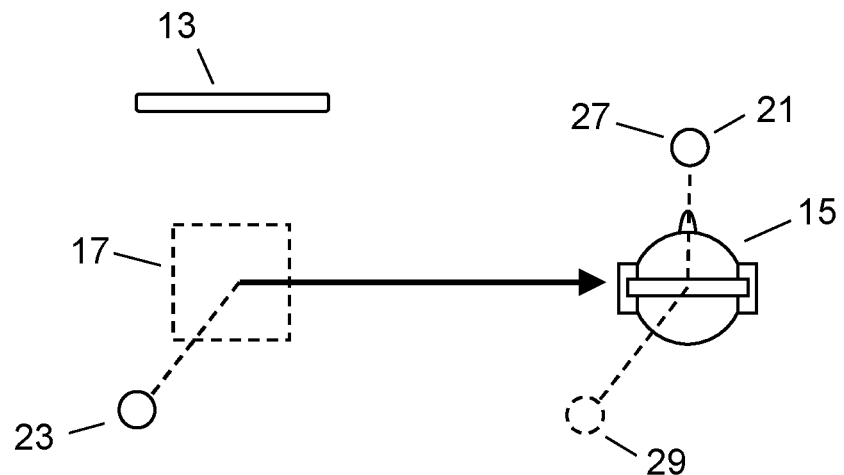
Figure 4:
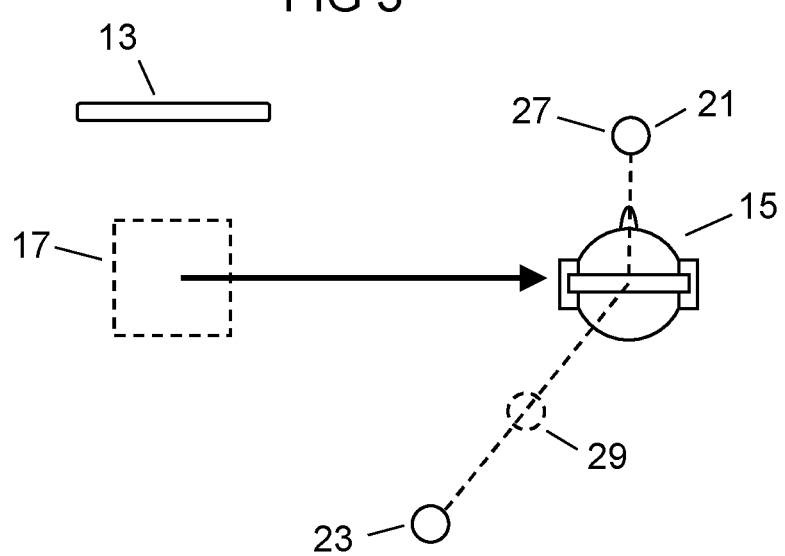
Figure 5:
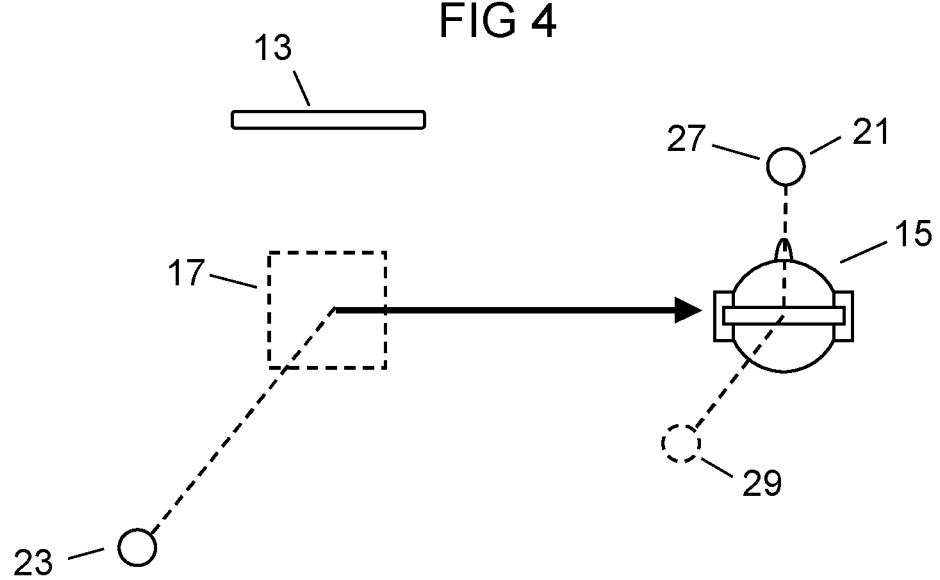
Figure 6:
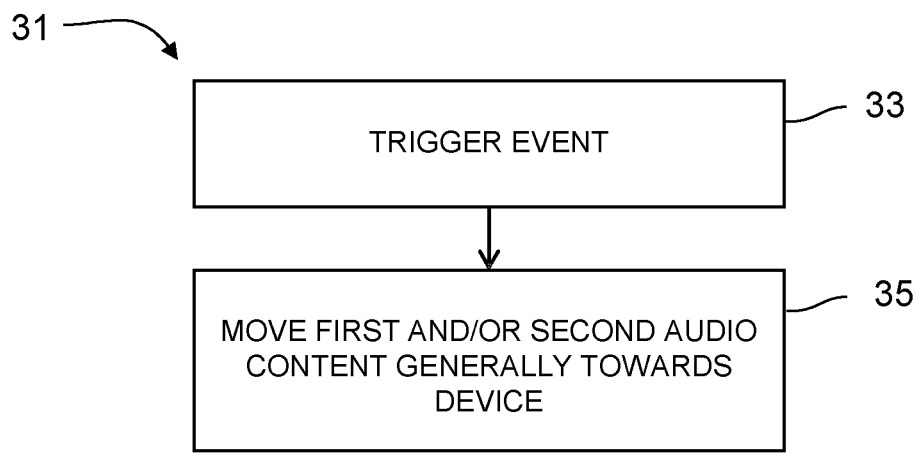
Figure 7:
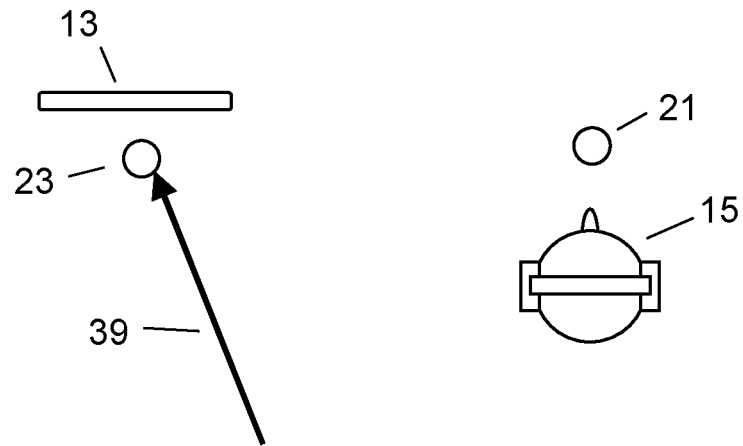
Figure 8:
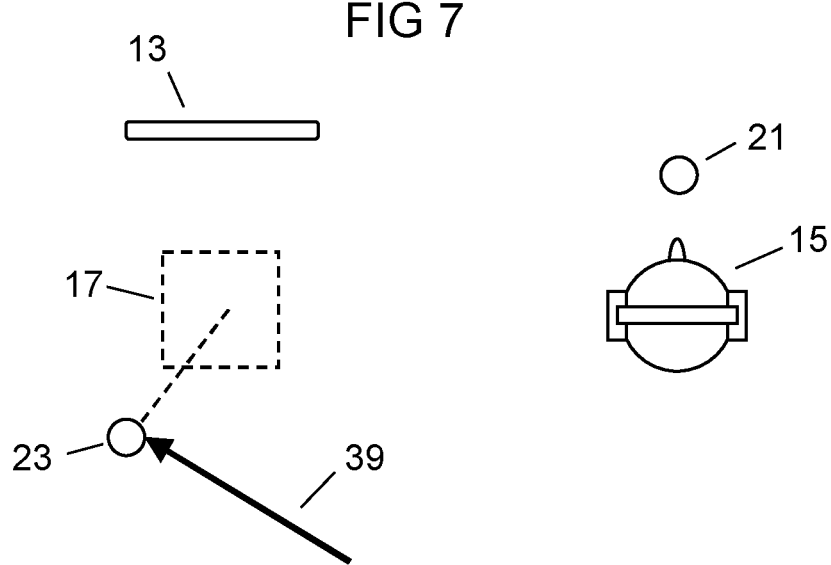
Figure 9:
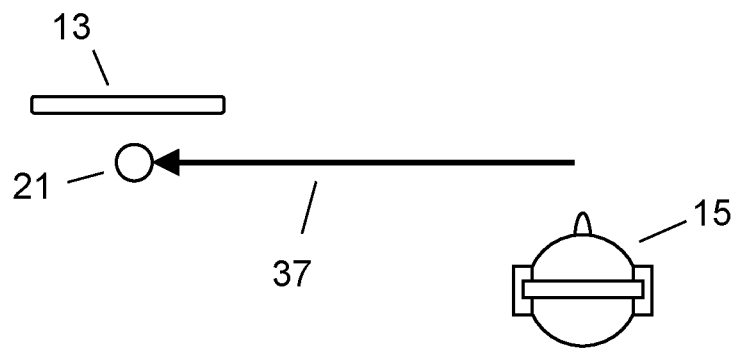
Figure 10A:
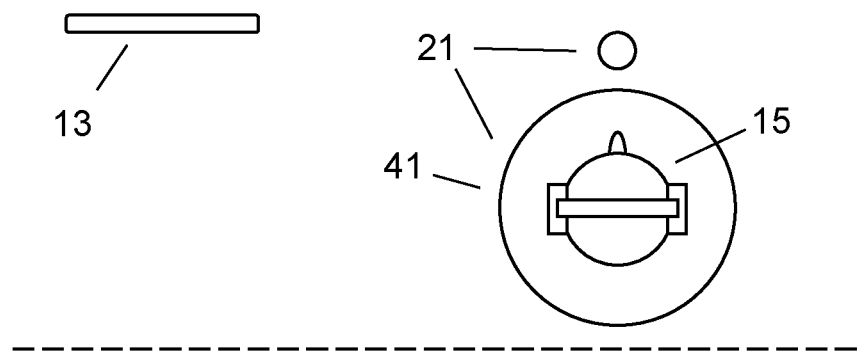
Figure 10B:
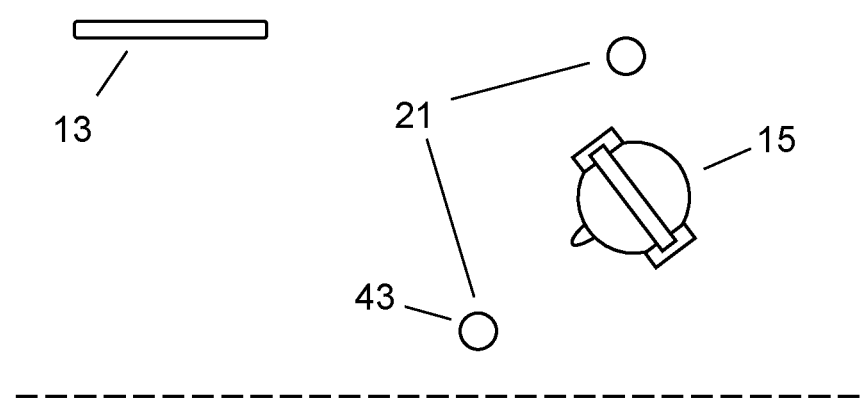
Figure 10C:
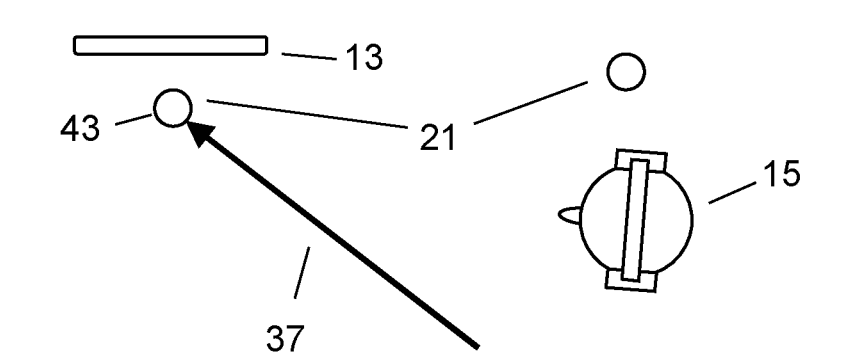
Figure 13:
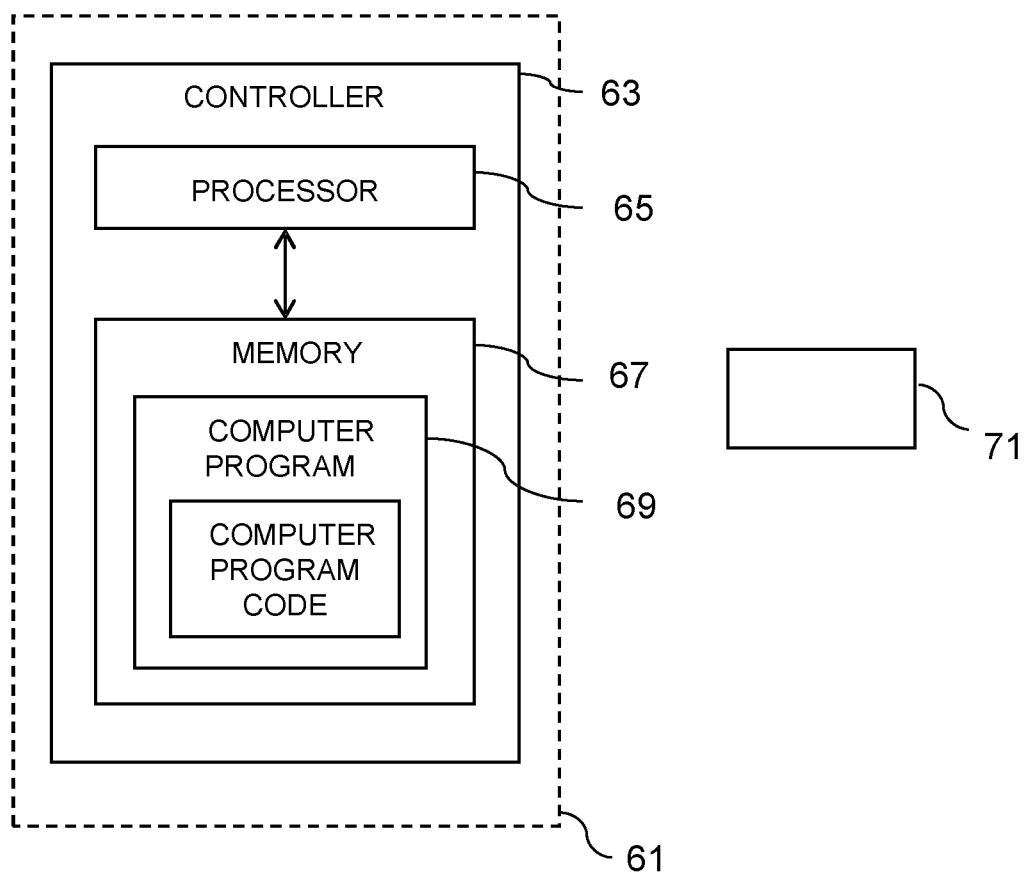

Some examples will now be described with reference to the accompanying drawings in which:

FIG. 1 shows an example method;
FIG. 2 shows an example of subject-matter described herein;
FIG. 3 shows an example of subject-matter described herein;
FIG. 4 shows an example of subject-matter described herein;
FIG. 5 shows an example of subject-matter described herein;
FIG. 6 shows an example method;
FIG. 7 shows an example of subject-matter described herein;
FIG. 8 shows an example of subject-matter described herein;
FIG. 9 shows an example of subject-matter described herein;
FIG. 10A to C show an example of subject-matter described herein;
FIG. 11A to C show an example of subject-matter described herein;
FIG. 12 shows part of an example method; and
FIG. 13 shows an example apparatus.

DETAILED DESCRIPTION

The FIGS. illustrate examples of a method, apparatus, and computer program by means of which spatialisation of audio content in a three-dimensional space is modified from a particular point of view of a listener (user 15) when they have moved away from a device 13. In so doing, when the audio content is transduced into sound, the user 15 can gain an understanding of their relative position to the device 13.

The device 13 can be a user 15 device 13 such as, for example, a mobile communication device 13, personal computer, television, or other multimedia device 13. In some examples the device 13 may be one via which an audio signal, comprising the audio content to be spatialised, is rendered. By "via" it is to be understood that the audio signal may be rendered at the device 13 or may be transmitted by the device 13 to another device, such as audio playback equipment, for rendering. The device 13 can, in some examples, comprise a user interface at which other sensory (such as visual or haptic) content accompanying the audio content may be presented in a form perceivable by the user 15 and/or at which the user 15 is able to interact with the device 13 to thereby provide user command inputs.

FIG. 1 is an example method. Method 1 is for rendering an output audio signal 11, for playback to a user 15, which is configured to enable the user 15 to gain an understanding of their relative position to a device 13 (in terms of direction, distance, or a combination thereof) from the spatialisation of audio content. Method 1 can be performed at the device 13 or at, for example, audio playback equipment, such as headphones or loudspeakers, or any other suitable means comprising a spatial audio codec and a suitable renderer.

An audio signal is an electrical signal, either digital or analog, that represents sound. Audio content is information encoded within an audio signal that, once transduced into sound, the user 15 can hear. Playback of audio content comprises transducing the audio content into sound so that the user 15 can hear this information.

At block 3 of method 1 an input audio signal 9 is obtained. The input audio signal 9 comprises at least first audio content 21 and second audio content 23. The input audio signal 9 can comprise spatial information. The spatial information can comprise spatial information about the sounds represented by the first and second audio content 21, 23. The input audio signal 9 can be formatted as, for example: metadata-assisted spatial audio (MASA), object-based audio, channel-based audio (e.g., 5.1 or 7.1+4), non-parametric scene-based audio (e.g., First-order Ambisonics, Higher-order Ambisonics), or combinations of these formats. The input audio signal 9 can be obtained from a remote server by or via the device 13 or obtained by retrieval from an addressable memory space of the device 13.

At block 5 of method 1 an output audio signal 11, with the first and second audio content 21, 23 spatialised within an audio scene, is rendered.

An audio scene is an arrangement of audio content in a three-dimensional space from a particular point of view within the three-dimensional space. That particular point of view can correspond to the position of the intended listener (the user 15) of the audio content upon playback. Accordingly, an audio scene can represent, in the form of an electronic signal, an arrangement of sounds from the perspective of an intended listener (the user 15).

The first and second audio content 21, 23 for the audio scene can be delivered in an encoded form (e.g., using a spatial audio codec such as Immersive Voice and Audio Services (IVAS)) and can be spatialised within the audio scene using a suitable renderer. For headphone listening, the spatialisation can comprise binauralisation.

The output audio signal 11 encodes spectral and temporal cues in respect of the first and second audio content 21, 23 as a result of which the user 15 can perceive the direction of arrival and their distance from the source of the sounds represented by the first and second audio content 21, 23 upon playback of the output audio signal 11.

Method 1 can reach block 5 by two paths: path A and path B. Following path A, the rendering of the output audio signal 11 (in block 5) can spatialise the first and second audio content 21, 23 in accordance with the spatial information comprised in the input audio signal 9. This spatialisation can be considered the default spatialisation of the first and second audio content 21, 23. The position of the first audio content 21 within the audio scene corresponding to the spatial information comprised in the input audio signal 9 can be considered its default position 27. The position of the second audio content 23 within the audio scene corresponding to the spatial information comprised in the input audio signal 9 can be considered its default position 29. The rendering can provide for a point of view within the audio scene that has three degrees of freedom (3DoF), the three degrees being those of three-dimensional orientation. Accordingly, the default positions of the first and second audio content 21, 23 within the audio scene are unaffected by translational movements of the user 15 but do respond to changes in the orientation of the user 15.

When the user 15 is at a default listening position 17 relative to the device 13, they experience the default spatialisation of the first and second audio content 21, 23. The default listening position 17 is a position relative to the device 13 in which the user 15 can, for example, see accompanying visual content displayed at the device 13 and/or can interact with the device 13 to provide user command inputs. In some examples the default listening position 17 may be a single point in space, and in other examples the default listening position 17 may have a spatial extent defined by thresholds. These thresholds may depend, for example, on the device's display size and/or acceptable angles for viewing the display.

Where the default listening position 17 has a spatial extent, the user 15 is able to move relatively with respect to the device 13 in a certain limited way without initiating a modification to the rendering of the output audio signal 11 that causes one or both of the first and second audio content 21, 23 to be spatialised in a manner that is out of accord with the spatial information comprised in the input audio signal 9. For example, the user 15 may be able to move within a space defined by a few degrees either side of a normal to the device's display without triggering the modification of the output audio signal 11 but more extensive lateral movement relative to this normal may initiate the modification.

The method 1 can reach block 5 via path B. Block 7 is comprised in path B.

At block 7 of method 1 a spatial audio modification is applied with respect to the first and second audio content 21, 23. Accordingly, when the output audio signal 11 is rendered in block 5, the spatialisation of the first and second audio content 21, 23 within the audio scene is modified. The modification is based on the relative real-world position of the user 15 with respect to the device 13.

Method 1 follows path B when there is a relative displacement of the user 15 from the default listening position 17, whether by movement of the user 15 or movement of the device 13. Thus, block 7 of method 1 is triggered by a relative displacement of the user 15 from the default listening position 17, whether by movement of the user 15 or movement of the device 13.

When the user 15 is at the default listening position 17 relative to the device 13, no spatial audio modification is applied when rendering the output audio signal 11. That is, when the user 15 is at the default listening position 17 relative to the device 13, method 1 follows path A and the output signal 11 is rendered with the first and second audio content 21, 23 according to the default spatialisation.

The spatial audio modification applied in block 7 is a function of at least the real-world distance 19 between the user 15 and the default listening position 17 which is applied to the spatial information comprised in the input audio signal 9 so that, when the output audio signal 11 is rendered, the first and second audio content 21, 23 are spatialised according to a modified spatialisation rather than the default spatialisation.

In some examples the spatial audio modification changes the spatial extent of the audio scene. For example, as the distance 19, in the real world, between the user 15 and the default listening position 17 increases, the audio scene may expand. This expansion of the audio scene provides the user 15 with audio-based understanding of being at a remove from the device 13. Likewise, as the distance 19, in the real world, between the user 15 and the default listening position 17 decreases, the audio scene may shrink.

In some examples, as shown in the example of FIG. 2, the spatial audio modification applied in block 7 increases a distance 25, within the audio scene, between the first and second audio content 21, 23 in response to an increase in distance 19, in the real world, between the user 15 and the default listening position 17.

In FIG. 2, in the real world, the user 15 is shown to have moved (for example, in a rightwards direction) away from the default listening position 17 which has a fixed spatial relationship with (for example, being directly in front of) the device 13. In response the second audio content 23 is displaced from its default position 29 within the audio scene. The second audio content 23 is displaced in a manner that increases its distance 25 from the first audio content 21.

In the example of FIG. 2 and in other examples, the second audio content 23 is at greater distance from the user 15 within the audio scene than if, in the real world, the user 15 was at the default listening position 17. This distancing of the second audio content 23 from the user 15 provides the user 15 with audio-based understanding of being at a remove from the device 13.

In some examples, the spatial audio modification applied in block 7 of method 1 does not affect, and thus preserves, the degrees of freedom of the point of view in respect of the second audio content 23. The spatial relationship between the second audio content 23 and the device 13 and default listening position 17 will therefore not be affected by changes in the orientation of the user 15. In other examples, the spatial audio modification applied in block 7 of method 1 can set a fixed spatial relationship between the second audio content 23 and the device 13 and default listening position 17 (for example, displacing the second audio content 23 to a position corresponding to the device 13 or the default listening position 17), in effect increasing the degrees of freedom of the point of view to six (6DoF) in respect of the second audio content 23, the six degrees being those of three-dimensional orientation and of three-dimensional location.

In the example of FIG. 2 and in other examples, as the distance 19, in the real world, between the user 15 and the default listening position 17 increases, the first audio content 21 maintains its default position 27 within the audio scene.

In some examples, the spatial audio modification applied in block 7 of method 1 does not affect, and thus preserves, the degrees of freedom of the point of view in respect of the first audio content 21. In other examples, the spatial audio modification applied in block 7 of method 1 does reduce the degrees of freedom of the point of view to zero (0DoF) in respect of the first audio content 21.

It is to be appreciated, however, that increasing a distance 25, within the audio scene, between the first and second audio content 21, 23 in response to an increase in distance 19, in the real world, between the user 15 and the default listening position 17 can result in the displacement of both the first and second audio content 21, 23 from their default positions 27, 29.

In some examples, the distance 25 within the audio scene between the first and second audio content 21, 23 is positively correlated with the distance 19 in the real world between the user 15 and the default listening position 17. Just as an increase in the distance 19 in the real world between the user 15 and the default listening position 17 initiates an increase in the distance 25 within the audio scene between the first and second audio content 21, 23, a decrease in the distance 19 in the real world between the user 15 and the default listening position 17 initiates a decrease in the distance 25 within the audio scene between the first and second audio content 21, 23. The distances may not be linearly correlated however nor may the correlation in each direction of displacement of the user 15 from the default listening position 17 necessarily be the same. In some examples there may be an upper limit to the distance 25 within the audio scene between the first and second audio content 21, 23 such that even if the distance 19 in the real world between the user 15 and the default listening position 17 continue to increase, the first and second audio content 21, 23 do not get further apart.

FIGS. 3 to 5 illustrate examples in which increasing the distance 25, within the audio scene, between the first and second audio content 21, 23 comprises displacement of the second audio content 23 from its default position 29 within the audio scene, its default position 29 corresponding to spatial information comprised in the input audio signal 9.

The displacement of the second audio content 23 from its default position 29 within the audio scene can comprise a translation equal to a displacement of the default listening position 17 from the user 15 as shown in FIG. 3. For example:

$$\underline{r}_{15,23} = \underline{r}_{15,29} + \underline{r}_{15,17},$$

where $\underline{r}_{15,23}$ is the position of the second audio content 23 within the audio scene after the spatial modification of block 7 of method 1, $\underline{r}_{15,29}$ is the default position 29 of the second audio content 23 corresponding to spatial information comprised in the input audio signal 9, and $\underline{r}_{15,17}$ is the displacement of the default listening position 17 from the user 15.

In the example of FIG. 3, the second audio content 23 maintains the position in real space (rather than within the audio scene) that it would have if the user 15 were at the default listening position 17. In this way, the user 15, when at a remove from the default listening position 17 always has the second audio content 23 as an indication of the general direction in which the device 13 lies. A similar effect can be achieved by setting a fixed spatial relationship between the second audio content 23 and the device 13 and default listening position 17 (for example, displacing the second audio content 23 to a position corresponding to the device 13 or the default listening position 17) at least until the user 15 returns to the default listening position 17 or there is a reason to indicate to the user 15 that they should return to the default listening position 17 (as described in more detail in relation to method 31 below).

In examples where the second audio content 23 maintains the position in real space that it would have if the user 15 were at the default listening position 17, the distance 25, within the audio scene, between the first and second audio content 21, 23 may sometimes initially reduce depending on the direction of the user's movement. For example, if the user 15 moves away from the default listening position 17 in the direction of the second audio content 23 the user 15 may experience the sensation of moving past the second audio content 23 within the audio scene before the distance 25, within the audio scene, between the first and second audio content 21, 23 begins to increase.

The displacement of the second audio content 23 from its default position 29 within the audio scene can comprise a translation equal to a scalar multiple of a displacement of the second audio content 23 from the user 15 at its default position 29 as shown in FIG. 4. The scalar multiple can depend on a magnitude of a displacement of the default listening position 17 from the user 15. For example:

$$\underline{r}_{15,23} = \underline{r}_{15,29} \cdot W \cdot |\underline{r}_{15,17}|,$$

where W is a weighting coefficient and $|\underline{r}_{15,17}|$ is the magnitude of the displacement of the default listening position 17 from the user 15.

This produces a positive correlation between the distance, within the audio scene, between second audio content 23 and the user 15 and the distance 19, in the real world, between the user 15 and the default listening position 17, thus giving an audio-based indication of the distance the user 15 is from the device 13. As a result, the user 15 has a clear audio-based understanding of how far away they are from the device 13 and default listening position 17, if not necessarily of the direction in which the device 13 lies.

The scalar multiple can further depend on the direction of the displacement of the default listening position 17 from the user 15, in which case the weighting coefficient may be a function of this direction. For example:

$$\underline{r}_{15,23} = \underline{r}_{15,29} \cdot W(\theta) \cdot |\underline{r}_{15,17}|,$$

where θ is the direction of the displacement of the default listening position 17 from the user 15.

The displacement of the second audio content 23 from its default position 29 within the audio scene can comprise a translation equal to the summation of both the displacement of the default listening position 17 from the user 15 and a scalar multiple of the displacement of the second audio content 23 from the user 15 at its default position 29 as shown in FIG. 5. Again, the scalar multiple can depend on a magnitude of a displacement of the default listening position 17 from the user 15. For example:

$$\underline{r}_{15,23} = \underline{r}_{15,29} \cdot W \cdot |\underline{r}_{15,17}| + \underline{r}_{15,17}$$

Again, the scalar multiple can further depend on the direction of the displacement of the default listening position 17 from the user 15, in which case the weighting coefficient may be a function of this direction. For example:

$$\underline{r}_{15,23} = \underline{r}_{15,29} \cdot W(\theta) \cdot |\underline{r}_{15,17}| + \underline{r}_{15,17}$$

In some examples wherein the translation can be selected based on the direction of the displacement of the default listening position 17 from the user 15. That is, depending upon the direction in which the user 15 moves away from the default listening position 17 (or the device 13 is moved away from the user 15), the translation that is applied to the second audio content 23 within the audio scene may change, not just in terms of magnitude but also in terms of the direction since each of the examples illustrated in FIGS. 3 to 5 can result in different directions of arrival at the user 15 for sounds represented by the second audio content 23. Combined with the application of a weighting coefficient which is a function of the direction of the displacement of the default listening position 17 from the user 15 in some examples of translations hereinbefore described, it is to be understood that in general the position of the second audio content 23 within the audio scene can be dependent on the direction in which the user 15 is displaced from the default listening position 17.

Method 1 provides the user 15 with an understanding of their spatial relationship to the device 13 whether in terms of distance, direction, or both. FIG. 6 illustrates an example method 31 for subsequently drawing the user's attention back to the device 13.

At block 33 of method 31 a trigger event occurs, as a result of which another spatial audio modification (as per block 35) is initiated.

The trigger event can indicate that there exists a reason to draw the user's attention to the device 13. Such a reason may arise, for example, when the user 15 may be about to miss an important part of the accompanying visual content or when user 15 is expected to interact directly with the device 13, for example to provide user command inputs.

The trigger event can be encoded within the input audio signal 9 or a multimedia file or bitstream which comprises the input audio signal 9.

The trigger event can be generated by the device 13. In some examples it may be generated independently of the input audio signal 9 or multimedia comprising the input audio signal 9. For example, the trigger event can comprise a request from one or more applications run on the device 13. In some examples the trigger event can be generated by the device 13 in response to recognition of content in the input audio signal 9 or multimedia comprising the input audio signal 9 which is considered to be important, whether generically so or specifically for the user, for example based on a recorded user profile.

At block 35, in response to the trigger event, at least one of the first and second audio content 21, 23 is moved 37, 39 closer to at least one of the device 13 and the default listening position 17. The movement 37, 39 of the at least one of the first and second audio content 21, 23 decreases a distance between the at least one of the first and second audio content 21, 23 and at least one of the device 13 and the default listening position 17.

As a result, from the perspective of the user 15, at least one of the first and second audio content 21, 23 moves 37, 39 generally towards the device 13, drawing the user's attention also towards the device 13. By "generally towards" it is to be understood that the first or second audio content 21, 23 may not be moving along a bearing which ever intersects with the device 13 itself, but the movement 37, 39 itself decreases the distance between the audio content 21, 23 and device 13.

In some examples, in response to the trigger event, at least one of the first and second audio content 21, 23 is moved 37, 39 to a position corresponding to the device 13.

In some examples, in response to the trigger event, at least one of the first and second audio content 21, 23 is moved 37, 39 to a position corresponding to the default listening position 17.

In some examples, in response to the trigger event, at least one of the first and second audio content 21, 23 is moved 37, 39 to respective positions corresponding to their default position 27, 29 translated by the displacement of the default listening position 17 from the user 15. That is, if the first audio content 21 is moved 37 in these examples, it is moved to a position corresponding to its default position 27 translated by the displacement of the default listening position 17 from the user 15 and if the second audio content 23 is moved 39 in these examples, it is moved to a position corresponding to its default position 29 translated by the displacement of the default listening position 17 from the user 15.

The spatial audio modification of block 35 (to move 37, 39 at least one of the first and second audio content 21, 23 generally towards the device 13) may be contingent upon the spatial audio modification of block 7 of method 1 having been applied to the preceding frame of the first and second audio content 21, 23. If the user 15 has not moved from the default listening position 17, there may not be a need to draw the user's attention back to the device 13. In some examples, between blocks 33 and 35 of method 31 there may be an intervening block in which it is determined whether or not there is a relative displacement of the user 15 from the default listening position 17, whether by movement of the user 15 or movement of the device 13.

Although both the first audio content 21 and the second audio content 23 can be moved in accordance with block 35, in some examples the initiation of their movement may not be simultaneous. If the distance 19 between the user 15 and the default audio position does not decrease in response to the movement 37, 39 of one of the first and second audio content 21, 23, the other of the first and second audio content 21, 23 can be moved to decrease its distance from (that is, moved closer to) at least one of the device 13 and the default listening position 17.

Even if the distance 19 between the user 15 and the default audio position does decrease, it can still be helpful to provide continued indication of the general direction of the device 13 as the user 15 moves to close the distance 19. Therefore, in some examples, if there remains a relative displacement of the user 15 from the default listening position 17 after the movement 37, 39 of one of the first and second audio content 21, 23, the other of the first and second audio content 21, 23 can be moved to decrease its distance from (that is, move closer to) at least one of the device 13 and the default listening position 17.

In some examples where the initiation of the movement 37, 39 of the first and second audio content 21, 23 is not simultaneous, the respective movements 37, 39 need not be entirely sequential either. There may be a partial temporal overlap between the movements 37, 39.

In some examples, at any time during block 35 of method 31, the user 15 can gesture to cancel the spatial audio modification. Upon said cancellation the first and second audio content 21, 23 revert to a modified spatialisation in accordance with block 7 of method 1.

FIGS. 7 and 8 illustrate examples of the movement 39 of the second audio content 23 to decrease a distance between it and at least one of the device 13 and the default listening position 17.

In the example of FIG. 7 the second audio content 23 is moved 39 to a position corresponding to the device 13. By following the sound resulting from the playback of the second audio content 23, the user 15 will thus approach the device 13. It is expected that the user 15 will then take up the default listening position 17 relative to the device 13 or at least a position suitable for, for example, viewing the accompanying visual content displayed upon the device 13 or inputting commands to the device 13 or otherwise directly interacting with the device 13. It is also possible that, although not shown, the second audio content 23 is moved 39 to a position corresponding to the default listening position 17. Accordingly, by following the sound resulting from the playback of the second audio content 23, the user 15 will approach and resume the default listening position 17.

In the example of FIG. 8 the second audio content 23 is moved 39 to a position corresponding to its default position 29 translated by the displacement of the default listening position 17 from the user 15. As a result, the second audio content 23 is positioned relative to the default listening position 17 the same as it would be if the user 15 were at the default listening position 17 and the second audio content 23 were rendered at a position within the audio scene corresponding to the spatial information comprised in the input audio signal 9. Although this may provide a less clear direction to guide the user 15 back to the default listening position 17 than the example of FIG. 7, it avoids further movement of the second audio content 23 to return it to its default position once the user 15 has reached the default listening position 17.

It is to be appreciated that while the examples of FIGS. 7 and 8 illustrate the movement 39 of the second audio content 23 along a path directly towards their eventual destination (either a position corresponding to: the device 13; the default listening position 17; or the second audio content's default position 29 translated by the displacement of the default listening position 17 from the user 15), the second audio content 23 can instead be moved first towards the position of the user 15 within the audio scene, for example to its default position 29 within the audio scene, and then away towards its eventual destination. This may initially attract the user's attention so that they are more aware of the subsequent movement 39 of the second audio content 23 towards its eventual destination.

FIGS. 9 and 10A to C illustrate examples of the movement 37 of the first audio content 21 to decrease a distance between it and at least one of the device 13 and the default listening position 17.

FIG. 9 illustrates an example in which the first audio content 21 is moved 37 to a position corresponding to the device 13. Since, in some example, the first audio content 21 represents sounds which would be predominantly frontal while the user 15 was at the default listening position 17, a similar effect can be achieved by moving 37 the first audio content 21 to a position corresponding to its default position 27 translated by the displacement of the default listening position 17 from the user 15. By following the sound resulting from the playback of the first audio content 21, the user 15 will thus approach the device 13. It is expected that the user 15 will then take up the default listening position 17 relative to the device 13 or at least a position suitable for, for example, viewing the accompanying visual content displayed upon the device 13 or inputting commands to the device 13 or otherwise directly interacting with the device 13. It is also possible that, although not shown, the first audio content 21 is moved 37 to a position corresponding to the default listening position 17. Accordingly, by following the sound resulting from the playback of the first audio content 21, the user 15 will approach and resume the default listening position 17.

FIGS. 10A to C illustrate an example in which the first audio content 21 is or comprises one or more diffuse components 41. These one or more diffuse components 41 illustrated in FIG. 10A are made directional as shown in FIG. 10B before being moved 37, as one or more directional components 43, generally towards the device 13 from the perspective of the user 15 as shown in FIG. 10C. The newly directional components 43 can be moved generally towards the device 13 from the perspective of the user 15 in the manner of FIG. 9, for example. In some examples, the one or more diffuse components 41 can be given a novel direction when made directional so as to further attract the attention of the user 15 before they are moved 37 generally towards the device 13 from the perspective of the user 15.

It is noted here that if the user 15 does follow either the first audio content 21 or the second audio content 23 or both back to the default listening position 17, upon reaching this position the default spatialisation as per block 5 of method 1 can be resumed. The example of FIG. 11A to C shows an example of how the audio content may transition back to the default spatialisation as the user 15 approaches the default listening position 17. As a distance 19 between the user 15 and the default listening position 17 decreases, the at least one of the first and second audio content 21, 23 moved (according to block 35 of method 31) to decrease its distance from at least one of the device 13 and the default listening position 17 is moved again towards a position corresponding to its default position 27, 29 translated by the displacement of the default listening position 17 from the user 15. Once the user 15 reaches the default listening position 17, the displacement of the default listening position 17 from the user 15 is zero and the audio content 21, 23 is positioned simply at its default position 27, 29. In FIG. 11A the first and second audio content 21, 23 have all been moved to a position corresponding to the device 13. As the user 15 comes closer to the default listening position 17 in FIG. 11B, the first and second audio content 21, 23 begin to move towards the positions from where the sounds they represent would be heard if the user 15 were at the default listening position 17. Once the user 15 arrives at the default listening position 17 in FIG. 11O, the first and second audio content 21, 23 have returned to their default positions 27, 29. In some examples, the transition described above may not begin until the distance 19 between the user 15 and the default listening position 17 has decreased to below a threshold value. The threshold value may be fixed or may be a percentage of the distance 19 at the time when the trigger event (of block 33) occurred.

In some examples, the first audio content 21 may be moved 37 before or even instead of the second audio content 23. For example, where, during block 7 of method 1, displacement of the second audio content 23 from its default position 29 within the audio scene can comprise a translation equal to a displacement of the default listening position 17 from the user 15 as shown in FIG. 3 or the second audio content 23 is displaced to a position corresponding to the device 13 or the default listening position 17, there is either no movement available towards the device 13 or such movement as there is available may be hard to notice from the perspective of the user 15 as there is only a short distance or small solid angle, from the perspective of the user 15, over which the second audio content 23 can move. Movement 37 of the first audio content 21 may therefore be more effective at drawing the user's attention back to the device 13.

In other examples, the first audio content 21 may, at least initially, maintain its default position 27 within the audio scene after the trigger event, while the second audio content 23 is moved 39 for the purpose of drawing the user's attention back to the device 13.

The reason for maintaining the first audio content 21 at its default position 27 both during block 7 of method 1 and then subsequently, at least initially, during block 35 of method 31 is that in some examples it may be part of a first group 53 of audio content considered to be more important for understanding the audio content comprised in the input audio signal 9 as a whole. The second audio content 23 may be part of a second group 55 of audio content considered to be less important for this purpose. Accordingly, if the most important content remains with the user 15 as long as possible, then the spatial audio modifications herein described are minimally disturbing to the user's consumption of the content as a whole.

In some examples the input audio signal 9 comprises these first and second groups 53, 55. For example, these groups 53, 55 can be written into the metadata comprised in the input audio signal 9. In other examples obtaining these groups 53, 55 may be performed as part of method 1

FIG. 12 shows an example of an additional method 1 block 51, which can be performed after block 3 and before block 7 if the input audio signal 9 does not already comprise first and second groups 53, 55 of audio content. In FIG. 12 audio content comprised in the input audio signal 9 is divided into at least first and second groups 53, 55 of audio content. The first audio content 21 as hereinbefore described can be comprised in the first group 53. The second audio content 23 as hereinbefore described can be comprised in the second group 55.

Regardless of whether the input audio signal 9 comprises first and second groups 53, 55 of audio content or whether the audio content is divided into first and second groups 53, 55 according to block 51, methods 1 and 31 as they are performed in respect of the first audio content 21 may likewise be performed on other audio content 57 in the first group 53. That is, a spatial audio modification applied to the first audio content 21 (for example, either in block 7 of method 1 or block 35 of method 31), if any, can also be applied to other audio content 57 of the first group 53.

Regardless of whether the input audio signal 9 comprises first and second groups 53, 55 of audio content or whether the audio content is divided into first and second groups 53, 55 according to block 51, methods 1 and 31 as they are performed in respect of the second audio content 23 may likewise be performed on other audio content 59 in the second group 55. That is, a spatial audio modification applied to the second audio content 23 (for example, either in block 7 of method 1 or block 35 of method 31), if any, can also be applied to other audio content 59 of the second group 55.

Consequently, method 1 can comprise obtaining an input audio signal 9 either comprising at least a first group 53 of audio content and a second group 55 of audio content or comprising audio content which is divided into such groups. Method 1 can comprise rendering an output audio signal 11 with audio contents of the first and second groups 53, 55 spatialised in an audio scene. The spatialisation may be, for example, in accordance with spatial information comprised in the input audio signal 9 about the sounds represented by the audio contents of first and second groups 53, 55. Method 1 can then comprise responding to an increase in distance 19, in the real world, between a user 15 and a default listening position 17 relative to a device 13 by increasing a distance, within the audio scene, between the audio content 21, 57 of the first group 53 and the audio content 23, 59 of the second group 55.

Method 31 can comprise responding to a trigger event by moving the audio content 21, 57 of the first group 53, the audio content 23, 59 of the second group 55, or both in a manner so as to decrease a distance between that audio content and at least one of the device 13 and the default listening position 17.

In some examples the dividing up of the audio content comprised in the input audio signal 9 comprises selectively assigning audio content to the first or second groups 53, 55 based on the audio content descriptors and/or spatial information regarding the audio content.

Audio content descriptors can identify associated audio content in the input audio signal 9 as being, for example, dialogue, music, sound effects, etc. For example, it may be considered important for the user 15 to be able to follow main dialogue easily so audio content identified as main dialogue may be assigned to the first group 53 and thus maintained in its default position within the audio scene when the user 15 is displaced from the default listening position 17. On the other hand, it may be considered less important for the user 15 to clearly follow sound effects. These may therefore be assigned to the second group 55 and thus displaced from their default positions within the audio scene in order to provide an audio-based understanding to the user 15 of being at a remove from the device 13.

In some examples, audio content which represents sounds which would be predominantly frontal while the user 15 was at the default listening position 17, such as sounds which would be perceived as originating from the device 13, may be assigned to the first group 53. Non-frontal sounds may be assigned to the second group 55.

In some examples, audio content which corresponds to accompanying visual content which is presented on a display of the device 13 may be assigned to the first group 53. Audio content which does not correspond to what is presented on the display may be assigned to the second group 55. Where the visual content presented on the display is determined by user action such as in virtual reality applications, the assignment of the audio content to first and second groups 53, 55 can therefore vary based on user action.

If audio content comprising diffuse components is assigned to the first group 53, it may be maintained with diffuse spatialisation at least until any movement of audio content of the first group 53 according to block 35 of method 31. At that time, the diffuse components are made directional such as shown in the example of FIG. 10A to C. If audio content comprising diffuse components is assigned to the second group 55, the diffuse components can be converted into directional components as part of the default spatialisation of block 5.

FIG. 13 illustrates an example apparatus 61 for performing the methods 1 and 31 described in relation to FIGS. 1 to 12 above.

The apparatus 61 may be or may be comprised in the device 13. Alternatively, the apparatus 61 may be or be comprised in audio playback equipment such as headphones.

The apparatus 61 comprises a controller 63. Implementation of a controller 63 may be as controller circuitry. The controller 63 may be implemented in hardware alone, have certain aspects in software including firmware alone or can be a combination of hardware and software (including firmware).

As illustrated in FIG. 13 the controller 63 may be implemented using instructions that enable hardware functionality, for example, by using executable instructions of a computer program 69 in a general-purpose or special-purpose processor 65 that may be stored on a computer readable storage medium (disk, memory, etc.) to be executed by such a processor 65.

The processor 65 is configured to read from and write to the memory 67. The processor 65 may also comprise an output interface via which data and/or commands are output by the processor 65 and an input interface via which data and/or commands are input to the processor 65.

The memory 67 stores a computer program 69 comprising computer program instructions (computer program code) that controls the operation of the apparatus 61 when loaded into the processor 65. The computer program instructions, of the computer program 69, provide the logic and routines that enables the apparatus 61 to perform the methods illustrated in FIGS. 1, 6, and 12. The processor 65 by reading the memory 67 is able to load and execute the computer program 69.

The apparatus 61 therefore comprises: at least one processor 65; and at least one memory 67 including computer program code, the at least one memory 67 and the computer program code configured to, with the at least one processor 65, cause the apparatus 61 at least to perform: obtaining 3 an input audio signal 9 comprising at least first audio content 21 and second audio content 23; rendering 5 an output audio signal 11 with the first and second audio content 21, 23 spatialised in an audio scene; and increasing 7 a distance 25, within the audio scene, between the first and second audio content 21, 23 in response to an increase in distance 19, in the real world, between a user 15 and a default listening position 17 relative to a device 13.

As illustrated in FIG. 13, the computer program 69 may arrive at the apparatus 61 via any suitable delivery mechanism 71. The delivery mechanism 71 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 69. The delivery mechanism may be a signal configured to reliably transfer the computer program 69. The apparatus 61 may propagate or transmit the computer program 69 as a computer data signal.

Computer program instructions for causing an apparatus to perform at least the following or for performing at least the following: causing an input audio signal 9 comprising at least first audio content 21 and second audio content 23 to be obtained; causing an output audio signal 11 to be rendered with the first and second audio content 21, 23 spatialised in an audio scene; and causing an increase in a distance 25, within the audio scene, between the first and second audio content 21, 23 in response to an increase in distance 19, in the real world, between a user 15 and a default listening position 17 relative to a device 13.

The computer program instructions may be comprised in a computer program, a non-transitory computer readable medium, a computer program product, a machine readable medium. In some but not necessarily all examples, the computer program instructions may be distributed over more than one computer program.

Although the memory 67 is illustrated as a single component/circuitry it may be implemented as one or more separate components/circuitry some or all of which may be integrated/removable and/or may provide permanent/semi-permanent/dynamic/cached storage.

Although the processor 65 is illustrated as a single component/circuitry it may be implemented as one or more separate components/circuitry some or all of which may be integrated/removable. The processor 65 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 1, 6, and 12 may represent steps in a method and/or sections of code in the computer program 69. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

Consequently, in some examples, the apparatus 61 comprises means for: obtaining 3 an input audio signal 9 comprising at least first audio content 21 and second audio content 23; rendering 5 an output audio signal 11 with the first and second audio content 21, 23 spatialised in an audio scene; and increasing 7 a distance 25, within the audio scene, between the first and second audio content 21, 23 in response to an increase in distance 19, in the real world, between a user 15 and a default listening position 17 relative to a device 13. The means may also be configured to perform other features of methods 1 and 31 described in relation to FIGS. 1 to 12.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. An apparatus comprising:
    at least one processor; and
    at least one memory including computer program code,
    the at least one memory storing instructions that, when executed by the at least one processor, cause the apparatus at least to:
    obtain an input audio signal comprising at least first audio content and second audio content;
    render an output audio signal with the first audio content and the second audio content spatialized in an audio scene; and
    in response to an increase in distance, in the real world, between a user and a default listening position relative to a device, increase a distance, within the audio scene, between the first audio content and the second audio content.

2. The apparatus of claim 1 wherein the first audio content has a default position corresponding to spatial information comprised in the input audio signal, and wherein as the distance, in the real world, between the user and the default listening position increases, the first audio content maintains its default position within the audio scene.

3. The apparatus of claim 1 wherein with the user at the default listening position, there is a first distance between the user and the second audio content in the audio scene;
    wherein with the user displaced from the default listening position, in the real world, there is a second distance between the user and the second audio content in the audio scene; and
    wherein the second distance is greater than the first distance.

4. The apparatus of claim 1 wherein the position of the second audio content within the audio scene is dependent on the direction in which the user is displaced from the default listening position.

5. The apparatus of claim 1 wherein the second audio content has a default position corresponding to spatial information comprised in the input audio signal, and wherein increasing the distance, within the audio scene, between the first and second audio content comprises displacement of the second audio content from its default position within the audio scene.

6. The apparatus of claim 5 wherein the displacement of the second audio content from its default position within the audio scene comprises a translation equal to:
    a scalar multiple of a displacement of the second audio content from the user at its default position, the scalar multiple depending on a magnitude of a displacement of the default listening position from the user; or
    the displacement of the default listening position from the user.

7. The apparatus of claim 6 wherein the scalar multiple further depends on the direction of the displacement of the default listening position from the user.

8. The apparatus of claim 6 wherein the translation is selected based on the direction of the displacement of the default listening position from the user.

9. The apparatus of claim 1 wherein, in response to a trigger event, the at least one memory and the instructions stored therein are configured to, with the at least one processor, further cause the apparatus to:
    move at least one of the first or the second audio content closer to at least one of the device or the default listening position.

10. The apparatus of claim 9 wherein the at least one of the first or second audio content is moved to one of:
    a position corresponding to the device;
    a position corresponding to the default listening position; or
    respective positions corresponding to respective default positions of the first or the second audio content translated by the displacement of the default listening position from the user, the respective default positions of the first or second audio content corresponding to spatial information comprised in the input audio signal.

11. The apparatus of claim 9 wherein if the distance between the user and the default listening position does not decrease in response to the movement of one of the first or the second audio content, the other of the first or the second audio content is moved closer to at least one of the device or the default listening position.

12. The apparatus of claim 1 wherein audio content comprised in the input audio signal is divided into at least:
   a first group, which comprises the first audio content; and
   a second group which comprises the second audio content,
   wherein a spatial audio modification applied to the first audio content, is also applied to other audio content of the first group, and
   wherein a spatial audio modification applied to the second audio content, is also applied to other audio content of the second group.

13. The apparatus of claim 12 wherein the at least one memory and the instructions stored therein are configured to, with the at least one processor, further cause the apparatus to:
   based on at least one of: one or more audio content descriptors or spatial information regarding the audio content, selectively assign audio content to the first or second group.

14. A method comprising:
   obtaining an input audio signal comprising at least first audio content and second audio content;
   rendering an output audio signal with the first audio content and the second audio content spatialized in an audio scene; and
   in response to an increase in distance, in the real world, between a user and a default listening position relative to a device, increasing a distance, within the audio scene, between the first audio content and the second audio content.

15. The method of claim 14 further comprising:
   in response to a trigger event, moving at least one of the first audio content or the second audio content closer to at least one of the device or the default listening position.

16. The method of claim 14, wherein audio content comprised in the input audio signal is divided into at least:
   a first group, which comprises the first audio content; and
   a second group which comprises the second audio content,
   wherein a spatial audio modification applied to the first audio content, is also applied to other audio content of the first group, and
   wherein a spatial audio modification applied to the second audio content, is also applied to other audio content of the second group.

17. A non-transitory computer readable medium comprising program instructions stored thereon for performing at least the following:
   causing an input audio signal comprising at least first audio content and second audio content to be obtained;
   causing an output audio signal to be rendered with the first audio content and the second audio content spatialized in an audio scene; and
   in response to an increase in distance, in the real world, between a user and a default listening position relative to a device, causing an increase in a distance, within the audio scene, between the first audio content and the second audio content.

18. The non-transitory computer readable medium of claim 17 wherein the second audio content has a default position corresponding to spatial information comprised in the input audio signal, and wherein increasing the distance, within the audio scene, between the first and second audio content comprises displacement of the second audio content from its default position within the audio scene.

19. The non-transitory computer readable medium of claim 17, wherein the program instructions are further configured to cause:
   in response to a trigger event, moving at least one of the first audio content or the second audio content closer to at least one of the device or the default listening position.

20. The non-transitory computer readable medium of claim 17, wherein audio content comprised in the input audio signal is divided into at least:
   a first group, which comprises the first audio content; and
   a second group which comprises the second audio content,
   wherein a spatial audio modification applied to the first audio content, is also applied to other audio content of the first group, and
   wherein a spatial audio modification applied to the second audio content, is also applied to other audio content of the second group.

* * * * *